United States Patent
Stophenson et al.

(10) Patent No.: US 8,203,953 B2
(45) Date of Patent: Jun. 19, 2012

(54) BI-DIRECTIONAL POLICER FOR DATA RATE ENFORCEMENT OVER HALF-DUPLEX MEDIUMS

(75) Inventors: David S. Stophenson, San Jose, CA (US); David J. Pignatelli, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 11/928,145

(22) Filed: Oct. 30, 2007

(65) Prior Publication Data

US 2009/0109847 A1 Apr. 30, 2009

(51) Int. Cl.
  *G01R 31/08* (2006.01)
(52) U.S. Cl. .................................................. 370/232
(58) Field of Classification Search ........... 370/232, 370/229, 230, 230.1, 235, 389, 392, 332, 370/252, 254, 310, 235.1; 713/153; 726/11, 726/12, 13
  See application file for complete search history.

(56) References Cited

U.S. PATENT DOCUMENTS

| | | | |
|---|---|---|---|
| 6,748,435 B1 * | 6/2004 | Wang et al. .................... | 709/225 |
| 6,826,150 B1 * | 11/2004 | Bhattacharya et al. ........ | 370/230 |
| 6,940,818 B2 * | 9/2005 | Moran et al. ................ | 370/235.1 |
| 7,006,440 B2 * | 2/2006 | Agrawal et al. ................ | 370/235 |
| 7,197,244 B2 * | 3/2007 | Thomas et al. .................. | 398/72 |
| 2003/0200463 A1 * | 10/2003 | McCabe ........................ | 713/201 |
| 2004/0141462 A1 * | 7/2004 | Mistry et al. .................. | 370/229 |
| 2005/0135378 A1 * | 6/2005 | Rabie et al. ............. | 370/395.21 |
| 2007/0036113 A1 * | 2/2007 | van der Gaast et al. ...... | 370/335 |
| 2007/0274228 A1 * | 11/2007 | Nandagopalan et al. ..... | 370/252 |

OTHER PUBLICATIONS

A path-aware rate policer: design and comparative evaluation, Arnaud Jacquet, Alessandro Salvatori (BT) and Bob Briscoe (BT & UCL), BT Technical Report TR-CXR9-2005-006 (Oct. 2005). (12pp, 15 refs, 13 figs).
Heinenan et al., A Single Rate Three Color Marker, RFC-2697, Sep. 1999.
Heinenan et al., A Two Rate Three Color Marker, RFC-2698, Sep. 1999.
Two-Rate Policer [Cisco IOS Software Releases 12.2 T]—Cisco Systems, Aug. 23, 2006.

* cited by examiner

*Primary Examiner* — Kwang B Yao
*Assistant Examiner* — Anh Ngoc Nguyen
(74) *Attorney, Agent, or Firm* — Baker Botts L.L.P.

(57) ABSTRACT

A bi-directional policer especially suitable for application in, but not limited to, wireless networks or other shared access or half-duplex communication mediums. In a particular implementation, bi-directional policers measure a flow of frames (L2) or packets (L3) in both directions and apply policing actions accordingly.

20 Claims, 5 Drawing Sheets

BI-DIRECTIONAL POLICER FOR DATA RATE ENFORCEMENT OVER HALF-DUPLEX MEDIUMS

TECHNICAL FIELD

The present disclosure relates generally to network traffic policing in wireless networks or other half-duplex media.

BACKGROUND

Policers are a commonly used capability in network infrastructures to measure the flow of frames (Layer 2 or L2) or packets (Layer 3 or L3) from a source to a destination and to subsequently take remedial action if the measurements are above a pre-determined threshold. Remedial actions include dropping packets, re-marking to a different priority (e.g., remarking Differentiated Services Code Point (DSCP) from AF41 to AF42) or doing nothing. There are several reasons why network engineers and network administrators use policers. For example, policers provide for the ability to charge for services based on the data rate allowed to a particular subscriber or class of subscribers. Some wired networks employ a shared medium (e.g., Ethernet hub). In this case, usage by one user of the shared medium takes away resources available to other users—thus, policers are used to enforce a maximum data rate usage for each user so that there are no bandwidth "hogs." Additionally, many networks provide Quality of Server (QoS) and access to QoS services needs to be limited so as not to overly deprive resources from best-effort services. This is particularly important on bottleneck connections such as wireless or WAN (e.g., T1 trunk) connections.

Currently, policer implementations are uni-directional in nature. Typically, they are instantiated on wired networks whose underlying medium is full duplex (e.g., fiber optic communications where there is a fiber in each direction of transmission between two nodes). In this case, usage of the medium in each direction is independent-usage in one direction does nothing which impacts the available resource in the opposite direction. However, many wireless communication bands are inherently half-duplex in nature. This can occur whenever a contiguous portion of radio spectrum is used for communication between two nodes in both directions. Examples of half-duplex bands include most unlicensed spectrum (e.g., 2.4-GHz ISM, 5-GHz UNII/ISM, 1910-1930 MHz unlicensed PCS). It also includes some licensed spectrum (4.9-GHz, 3.75-GHz, MMDS, PTT bands, etc.). In these bands, usage of the spectrum for one direction of communication prevents simultaneous usage in the opposite direction. Another characteristic of wireless communications is that, generally, a plurality of users are sharing the same spectrum. This means that usage by one user negatively impacts the amount of capacity available to other users in a wireless network.

DESCRIPTION OF EXAMPLE EMBODIMENTS

A. Overview

The present invention is directed to a bi-directional policer especially suitable for application in, but not limited to, wireless networks or other shared access or half-duplex communication mediums. In a particular implementation, bi-directional policers measure a flow of frames (L2) or packets (L3) in both directions and apply policing actions accordingly. Functionally, a bi-directional policer can be implemented using two-uni-directional policers which share a common usage metric (i.e., a single metric for both upstream and downstream measurements). An example of this is a bi-directional token bucket policer. Packets transmitted in either direction consume tokens, but whenever a packet enters the policer that has insufficient tokens in its bucket(s) remedial action is taken, independent of whether it is being transmitted in the upstream or downstream direction.

Like uni-directional policers, bi-directional policers can be single-rate or dual-rate policers, two or three color markers and color blind or color aware. See, e.g., Heinenan et al., A Single Rate Three Color Marker, RFC-2697 (September 1999); and Heinenan et al., A Two Rate Three Color Marker, RFC-2698 (September 1999). Furthermore, the remedial actions taken by bi-directional policers can be the same as for uni-directional policers. Bi-directional policers also have utility in measuring aggregate data rate usage. Typically, traffic flows are identified by the classic "5-tuple" including Internet Protocol (IP) Source Address, IP Destination Address, IP protocol, Source Port, and Destination Port. Aggregate policers measure all traffic to and/or from a client as identified by its IP address or MAC address. They can meter all traffic or just the traffic belonging to a particular traffic class (e.g., QoS priority level). Bi-directional policers may be applied to various points of the QoS hierarchy, such as individual traffic flows, all flows for a QoS class, aggregate client flows (flows on all QoS classes for a particular client), Service Set Identifier (SSID) flows (either per QoS class or aggregate), radio level flows (either per QoS class or aggregate), or flows from an egress port from controller to access point. For example, one possible application is to police a set of users belonging to a particular VLAN or wireless SSID (i.e., in 802.11 networks). An advantage of a bi-directional policer relates to its role in metering half-duplex communications. Network administrators do not have to specify in which direction the capacity is used, just the total data rate constraint(s). In many cases the direction of a flow is not as important as the consumption of the medium resource, which is the same, independent of the direction of the flow. For example, typically network administrators install policers in the downstream direction. If a uni-directional policer is instantiated in one direction (say from the network to the host—i.e., the downstream direction), but the network is not communicating any packets to that host, no policing actions will be taken. However, if some users are transmitting many packets upstream, then there may be little capacity available for downstream transmissions.

Particular implementations of the invention extend the concepts of uni-directional policers by combining two uni-directional policers into a single bi-directional policer with consequently improved capacity management capability for half-duplex communication media. As described below, this can be accomplished by having separate classification logic units that classify traffic in both the upstream and downstream direction index the same policer. Bi-directional policers have several benefits. They are better matched to half-duplex transmission media, as they measure resource utilization whenever it occurs, independent of the direction of communication between two nodes. Furthermore, bi-directional policers provide a more flexible framework for a network administrator as they accept an overall data rate utilization rather than two separate data rate limits for upstream and downstream transmission. In many cases a network administrator may not know ahead of time how users traffic will split and thus would have to estimate this. This estimate may be incorrect and paying subscribers may complain about poor network performance.

With a single-bi-directional policer, it is possible for a system administrator to assign a bi-directional policer which polices overall traffic regardless of whether it's in the upstream or downstream direction. Bi-directional, single policers reflect the fact that whether the transmission is upstream or downstream, medium time usage, the basic unit of bandwidth currency, is used and gives the client the most flexibility in using their fair share of the available medium time. Therefore, excessive upstream traffic usage can affect the amount of downstream traffic that will be delivered to a client.

B. Example Wireless Network System Architecture

B.1. Network Topology

Figure 1A:
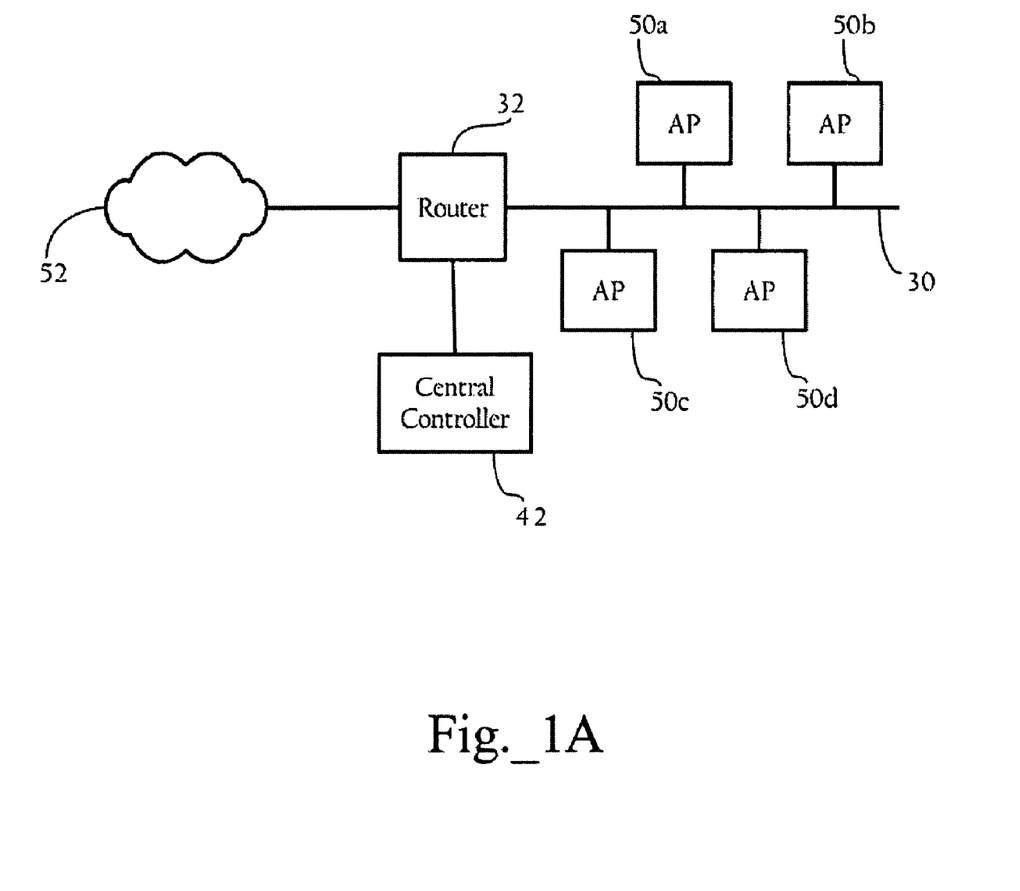
FIG. 1A illustrates example components in a wireless local area network (WLAN) system.

FIG. 1A illustrates example components in a wireless local area network (WLAN) system. In a specific embodiment of the present invention, the system includes a WLAN management server 20, a central controller 42, a local area network (LAN) 30, a router 32, and wireless access points 50a, 50b, 50c, and 50d. LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between remote hosts and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

B.2. Wireless Access Points

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (not illustrated). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

Figure 1B:
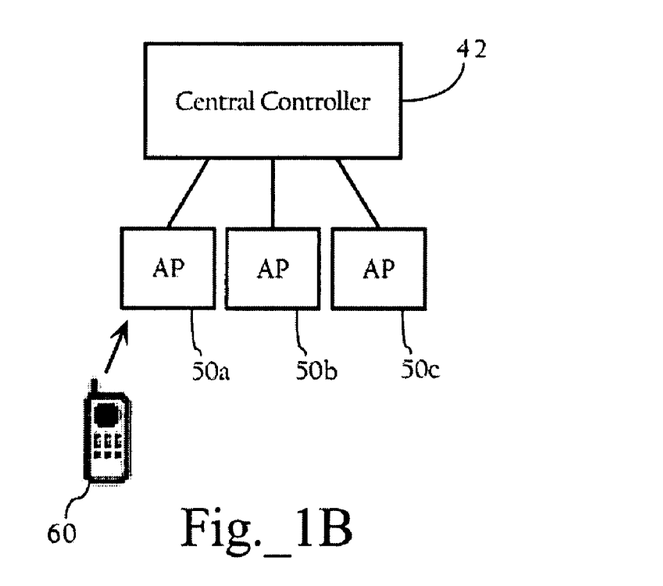
FIG. 1B illustrates an example hierarchical wireless network including a central controller.
Figure 1C:
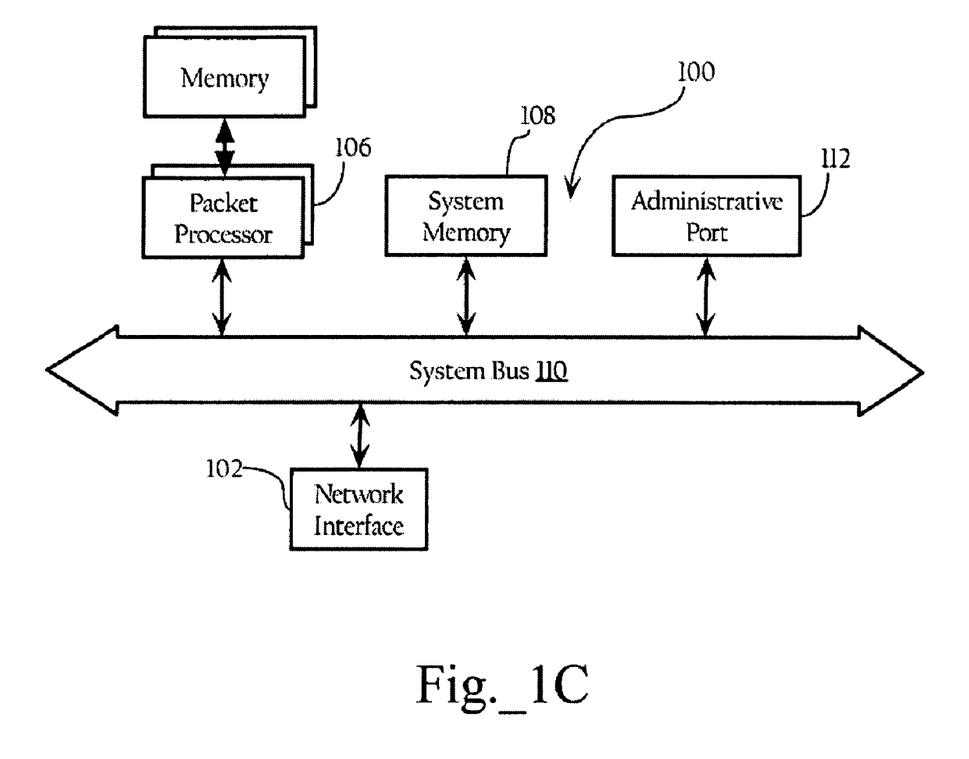
FIG. 1C illustrates an example hardware system, which may be used to implement a central controller.
Figure 2:
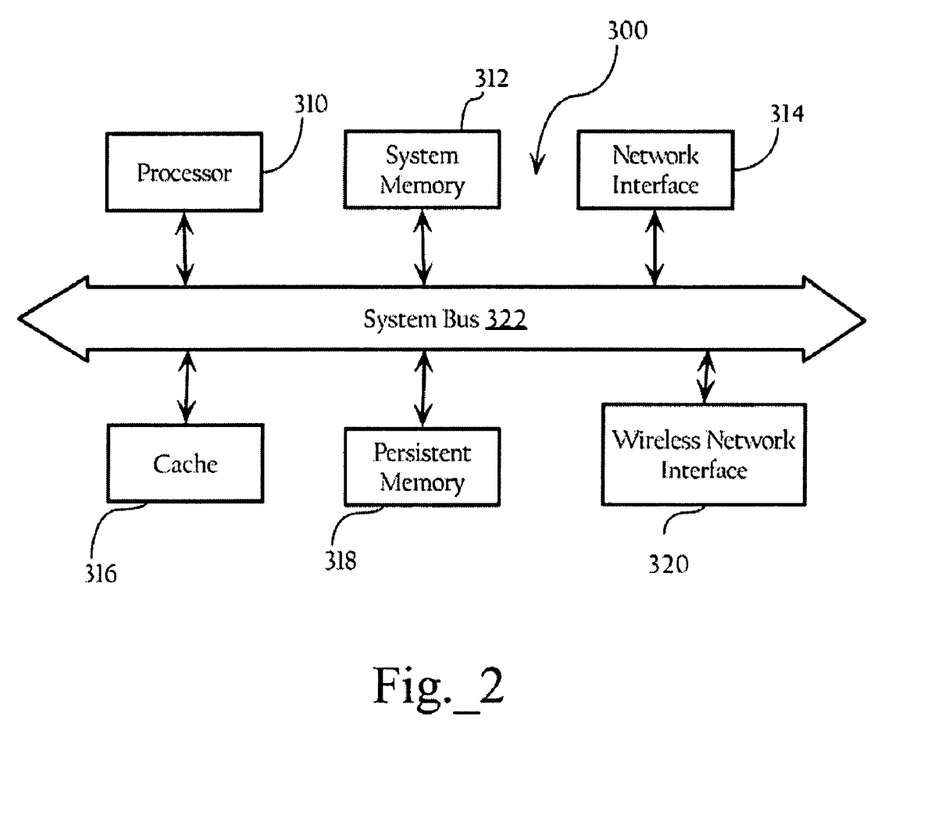
FIG. 2 illustrates an example hardware system, which may be used to implement a wireless access point.

FIG. 2 illustrates for didactic purposes a wireless access point, which can be used to implement a wireless access point 50 of FIG. 1. In one implementation, the wireless access point comprises a processor 310, a memory 312, a network interface 314 (e.g., an Ethernet or 802.3 interface) for communication with a LAN, a wireless network interface 316 (e.g., an IEEE 802.11 WLAN interface) for wireless communication with one or more wireless clients 60, a persistent memory 318, a cache 320 for storing connection state information, and a system bus 308 interconnecting these components. The wireless access points 50 may also include software modules (including DHCP clients, Cisco® Discovery Protocol (CDP) modules, wireless access point modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310.

B.3. Central Controller

FIG. 1B illustrates a hierarchical wireless network including a central controller 42, which may be used implement the central controller 42 of FIG. 1A according to one implementation of the present invention. The hierarchical wireless network system can be implemented virtually or physically. In a physical implementation, the access points 50 are directed connected to the central controller 42. In a virtual implementation, the access points are logically associated with the central controller 42 over LAN 30. In one implementation, the central controller 42 may be implemented as a wireless domain server (WDS) or, alternatively, as a wireless switch. If the central controller 42 is implemented with a WDS, the central controller 42 is operative to communicate with autonomous or so-called "fat" wireless access points. If the central controller 42 is implemented as a wireless switch, the central controller 42 is operative to communicate with light-weight wireless access points and process wireless protocol and network management information.

FIG. 1C illustrates an example hardware system 100, which may be used to implement a central controller 42. As FIG. 1C shows, in one implementation, the central controller 42 includes a network interface 102, one or more packet processors 106, a system memory 108 that stores one or more software modules such as a wireless network module including instructions for performing the functions described herein, and a system bus 110 operably connecting these components. In one implementation, each of the packet processors 106 may be application-specific integrated circuit (ASIC)-based with the necessary logic and embedded central processing units (CPUs) for performing some of the functions described herein. The packet processors 106 may include hardware data path logic to accelerate various packet processing operations, such as hardware packet parsing logic operative to parse packet headers, flow classification, policers, encapsulation, transmit scheduling, and the like. The central controller 42 may optionally include an administrative port 112 allowing for administrative access for such purposes as configuration and diagnostic access. In other implementations, central controller 42 includes multiple network interfaces and a switch fabric to support implementations where the access points are directly connected to the central controller 42.

Referring back to FIG. 1A, central controller 42 manages packet traffic for both upstream and downstream traffic between remote nodes and the wireless clients 60 connected to access points 50. As used in the context of this disclosure, upstream traffic refers to packet traffic being sent from mobile stations 60 via the access points 50 and to one or more remote nodes. Similarly, downstream refers to traffic originating from a remote node and flowing to mobile stations 60 via access points 50. The policing functions described herein operate in connection with both upstream and downstream traffic. However, in one implementation, while both upstream and downstream traffic relevant to a given policer is measured, the policers may be configured to implement remedial action only on downstream traffic, since upstream traffic has already consumed over-the-air bandwidth by the time it reaches the policer. As discussed below, the policers may be implemented at the central controller 42 or at each access point 50. In the latter embodiment, the central controller 42 can transmit configuration messages operative to configure one or more policers as required.

C. Example Hardware Data Path & QoS Architecture

Figure 3:
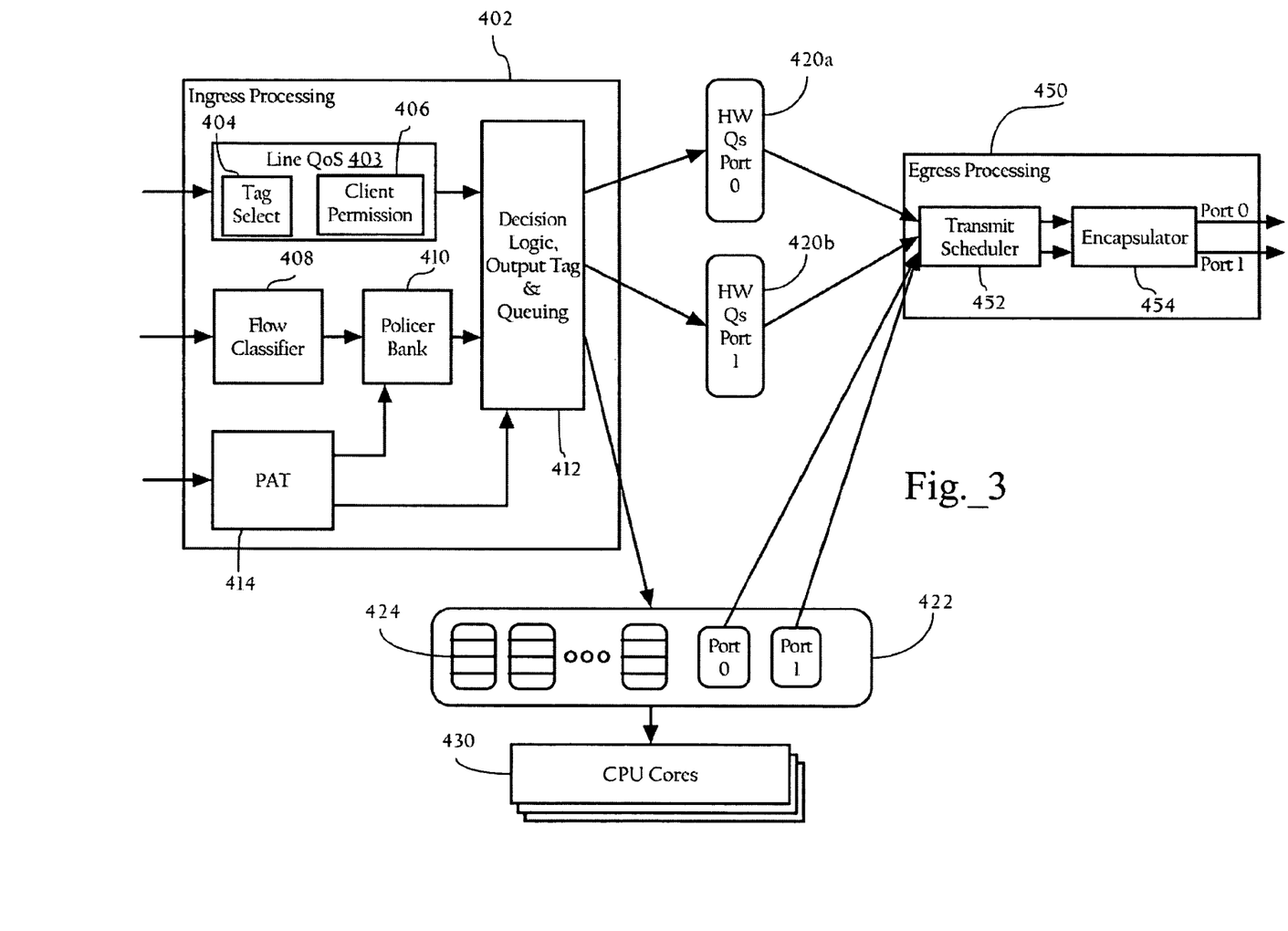
FIG. 3 illustrates an example hardware data path and Quality of Service Architecture, according to one possible implementation of the invention.

FIG. 3 illustrates a functional QoS architecture implemented by a hardware data path according to one possible implementation of the invention. This functional QoS architecture, in one implementation, can be incorporated into the functionality of central controller 42 or one or more access points 50. Referring to the block diagram of FIG. 3, in the implementation shown, the hardware data path includes Ingress Processing and Egress Processing blocks 402, 450, as well as hardware (HW) and software (SW) queues 420a, 420b, and 422 and one or more central processing unit (CPU) cores 430. CPU cores 430, in a particular implementation, are generally operative to perform control plane processing operations.

Referring to FIG. 3, a packet with its pre-parsed header (PPH) is input to QoS Ingress Processing block 402. Depending on configuration, tag selector 404 selects one of several tags to set an internal Differentiated Services Code Point (iDSCP) and internal user priority (iUP) for subsequent processing. The iUP is assessed at client permissions module 406 (either configured or provided via an authentication server (AAA) override) to determine if the packet should be tagged for dropping in the decision logic block 412. In parallel, the packet is compared to flow classifiers 408 that have been configured. Flow classifiers 408, in one implementation, can be configured to match packets based on one or more fields of Layer 2 and/or Layer 3 headers, such as source IP address, destination IP address, MAC address, port numbers, protocol identifiers, and the like. Flow classifiers 408 are used to determine the proper L3 and/or L2 QoS tag for traffic streams. Flow classifiers 408 can be used for streams from untrusted sources; however, they can also used to identify a stream for the purposes of assigning a policer.

If there is a hit in the flow classifiers 408, a flow iDSCP or iUP is output and then a specific policer of policer bank 410 is invoked for further processing. Policers can also be invoked by inputs from the Line QoS block 403 to police flows based on knowing the wireless client associated with the frame. The programmable action table 414 is an additional logic module that can invoke policers based on attributes of frames. The programmable action table 414 can also be used to select a software queue 424 of the software queue block for received frames, such as control or management frames, that are to be processed by CPU cores 430. A policer can be configured to limit the packets per second that enter these SW queues 424 to protect them. The decision logic 412 determines whether to act upon outputs from Line QoS 403 or Flow QoS 408, or programmable action table (PAT) 414 based on an internal weight, which has been configured by software. Once this has been done, the corresponding iDSCP or iUP is used to determine all the output tags (L2 and L3 inner/outer tags) which are re-inserted to the parsed packet header. The iUP is used to select an output queue—either a HW queue (port 0 (420a) or port 1 (420b)) or a SW queue 424 of a plurality of software queues 424. The selection of whether to output the frame on port 0 or port 1 comes from bridging function implemented by controller 42, not QoS processing.

Whether or not to actually queue the packet into one of the HW or SW queues 420a, 420b or 424 is a decision of the queuing function. If one of the early processing steps determined that the packet should be dropped, perhaps because the client did not have permission to use the queue or because of excessive traffic at one or more of the levels in the QoS hierarchy, then the packet will not be enqueued. Another reason the packet may not be enqueued is if the queues are too full. In one particular implementation, active queue management (AQM) algorithms manage the queues. These queuing decisions may be based, in part, on the color marks associated with the frames by a policer.

A transmit scheduler 452 of egress processing module 450 removes packets from the HW and SW queues according to its scheduling algorithm and passes them onto the encapsulater 454. In a particular implementation, one of the SW transmit queues is a priority queue (i.e., priority scheduled) and the other is normal priority. The transmit scheduler 452 is also responsible for multicast/broadcast packet replication. The encapsulater 454 takes the needed information from the PPH and inserts it into the final encapsulated packet. In a particular implementation, the presence or absence of L2 tags is VLAN configuration dependent.

In a particular implementation, the hardware data path includes a policer bank 410 of 16383 policers. In the implementation shown in FIG. 3, policers are hardware-based logic that can be configured as bi-directional or uni-directional, given some QoS metric (e.g., maximum data rate), and attached to various instances of the QoS hierarchy, such as an access category, an individual flow, and a client. These policers may be linked from the service modules (Line/Client QoS 403, Flow QoS 408 and PAT 414) of the hardware data path. The service modules provide a policer index $\epsilon\{1 \ldots 16383\}$ to identify a policer to act upon a packet. Policer index zero is a reserved value to indicate no policing action is needed. A given policer can be attached or associated with any level of the QoS hierarchy, such as access category, client, radio, access point, and the like.

A policer, in a particular implementation, is a device which measures packet rates in bytes (or packets) per second, for example, and outputs both a policing action and a policing color. For example, policers make local measurements of traffic rates and then locally enforce their configured traffic limits typically by re-marking (i.e., changing the 802.1p tag, DSCP or both) and/or dropping frames which exceed their configured limits. Each policer, in one implementation, is a token bucket policer capable of providing a color-aware, single-rate or dual-rate, three-color marker which operates in accordance with RFC-2697 and RFC-2698 respectively. This means that the marker will produce output packets of color green (conforming traffic), yellow (exceeding [the rate limit] traffic) and red (violating traffic). Typically, green packets will be enqueued for transmission (unless the transmit (Tx) queue is completely full), yellow packets will be dropped during queue congestion (but transmitted otherwise) and red packets will be dropped. Single-rate, three-color markers are suitable for policing bursty traffic such as best-effort data and video traffic. The policers may also be capable of operating in color-blind, single-rate or dual-rate, two-color mode. This mode of operation is suitable for policing fixed-rate traffic such as voice. One of the benefits of a color aware marker is in video applications. MPEG4 is defining an advance video encoder, which marks a packet's drop precedence commensurate with the video impairment, which would be suffered if the packet were dropped. A color aware marker can use this to advantage whereas a color-blind marker cannot.

In one implementation, the policer applies a token bucket algorithm to enforce data rate utilization. A token bucket is a control mechanism that can be used to control when a frame is transmitted. The token bucket contains tokens, each of which can represent a unit of bytes or a single packet. Tokens in the bucket are deducted in exchange for the ability to send a packet. In prior art policers, a given token bucket is maintained only for a single direction of traffic. In one example bi-directional policer of the invention, a given token bucket is maintained and adjusted in response to packets traveling in either the upstream or downstream direction. A network administrator may configure how many tokens are needed to transmit how many bytes; when tokens are present, transmission of a frame is permitted. If there are no tokens or insufficient tokens in the bucket, frame transmission is not permitted. Therefore, packet traffic can flow up to a peak burst rate if there are adequate tokens in the bucket and if the burst threshold is configured appropriately. The token bucket algorithm, as applied to a bytes per second enforcement model, can be conceptually understood as follows:

A token is added to the bucket every 1/r seconds.

The token bucket can hold at the most b tokens. If a token arrives when the bucket is full, it is discarded.

When a frame of n bytes arrives, n tokens are removed from the bucket, and the packet is transmitted.

If fewer than n tokens are available, no tokens are removed from the bucket, and the packet is considered to be non-conformant.

The algorithm allows bursts of up to b bytes, but over the long run the output of conformant packets is limited to the constant rate, r. Non-conformant packets can be treated in various ways: 1) They may be dropped; 2) They may be enqueued for subsequent transmission when sufficient tokens have accumulated in the bucket; and 3) They may be transmitted, but marked as being non-conformant, possibly to be dropped subsequently if the network is overloaded. The policers of policer bank 410 may be configured to mark frames and take other remedial actions based on whether a packet is conforms or not.

In a particular implementation, each policer supports the following policing actions: 1) Transmit (which is equivalent to do nothing, other than measure); 2) Drop (discarding packets); and 3) Set DSCP or set UP. In the hardware data path, setting DSCP or UP actually sets iDSCP or iUP which, in turn, will be used to set the output tags correctly (either DSCP or UP). It is the responsibility of configuration software to configure policers and egress marking tables congruently to provide the desired operation. Set DSCP is a possible action when packets are excessive or violate some constraint, such as data rate. Policers produce, in one implementation, a 2-bit field representing the output color for the queuing function. Providing the output color to the queuing function facilitates better queuing operation, since the queuing algorithm does not have to understand the different iDSCP or DSCP values in order to know whether to enqueue or drop a packet during periods of queue congestion. Rather, the queuing algorithm can rely on the color markings of the frames. 3-color policers produce an output color of green, yellow or red corresponding to conforming, excessive or violating traffic, respectively. 2-color policers produce an output color of green or red. Depending on the policing action, an output color of red may cause the packet to always be dropped (if the policing action is drop) or to be dropped only if the HW output queue is at some minimal level of congestion. Typically, packets colored red are dropped without regard to HW queue congestion. Packets colored yellow are dropped if some threshold congestion level is reached.

As discussed above, policers can be configured to be uni-directional or bi-directional. However, the logic to configure the policer directionality modes is essentially external to the policers themselves. Operationally, all policers, in one implementation, have no inherent recognition or concept of direction. Rather, the service module invoking the policer either calls the same policer for upstream and downstream packets or it calls different policers (i.e., policer having a different index). For example, in the case of flow classifiers 408, policers have no inherent direction. Rather, policers are essentially called or invoked by flow classifiers 408 which are capable of classifying packets based in part on direction. Accordingly, in one implementation, to configure a bi-directional policer, two flow classifiers classifying traffic in the upstream and downstream direction, respectively, are configured to index to the same policer. Classification based on other aspects of the QoS hierarchy may be inherently bi-directional, since they do not depend on packet direction.

Given the foregoing, bi-directional policers have approximately the same implementation complexity and overhead as uni-directional policers. For example, in a token bucket policer, memory required to hold the tokens is the same for uni-directional and bi-directional policers. Bi-directional policers use one set of token buckets for measuring, just like a uni-directional policer. However, unlike a uni-directional policer, a bi-directional policer performs token bucket processing when either an upstream or downstream packet is received. Accordingly, when a bi-directional policer is configured the bandwidth or other rate specified applies to the aggregate of traffic in both the upstream and downstream direction.

In one implementation, each policer supports the following measurement types: 1) Bytes per Second (BPS); 2) Packets per Second (PPS); and Count. For BPS, an example range of measurement for policers is from 1 kBps to 25 MBps with 1 kBps resolution. On the high end, this supports operation with 802.11n radios and on the low end supports the bandwidth required by a single G.729 phone call. For PPS, an example range of measurement for policers is from 1 PPS to 14,400 PPS with a resolution of 1 PPS. This range is derived from the maximum packet rate over 802.11a interface at 64-byte packets (3.6 kPPS) times 4 for 802.11n radios. Count represents the number of times a policer is called, and could be maintained by a 24-bit counter for example. Another possible metric for a single bi-directional policer is based on medium time used. Using medium time equalizes the effects of physical layer (PHY) rate shifting (that is, a client operating at 24 Mbps would get more bytes through the medium than one operating at 6 Mbps when comparing equivalent consumption of medium time) and L2 retries. In a particular implementation, a token bucket policer may be used where the tokens in the bucket would represent increments of medium time (e.g., 32 microseconds per token). A radio module of an access point can measure the amount of medium time consumed by a received frame and would provide this metric to the policer. Similarly, the access point can measure the amount of medium time consumed by the frames it transmits to clients and provides these measurements to the policer as well. The bi-directional policer can then deduct tokens as required, and apply one or more remedial actions based on the state of the bucket.

As discussed above, a bi-directional policer may be located at the central controller 42 or individual access points 50. Locating a bi-directional policer at the central controller 42 or access point 50, however, essentially means that the remedial actions applied by the policer do not directly impact utilization of upstream wireless bandwidth between a given wireless client 60 and an access point 50. Accordingly, in one implementation, while both upstream and downstream traffic relevant to a given policer is measured, the policers may be configured to implement remedial action only on downstream traffic, since upstream traffic has already consumed over-the-air bandwidth by the time it reaches the policer; this can often be a particularly important factor in mesh networking since bandwidth consumed on the mesh is a valuable resource. In this case, if a packet is dropped on egress from the mesh, it will be to be retransmitted by the source node thereby consuming medium time on multiple mesh hops. In other implementations, the policers may be configured to apply a first remedial action to upstream packets, and a second remedial action to downstream packets that is different from the first remedial action.

In other implementations, remedial action is performed in both directions. The bi-directional policer, however, is still operative to enforce an overall data rate given that traffic in both the upstream and downstream direction is measured and applied to the token bucket. Furthermore, transmission of upstream traffic might be affected due to rate back-off provided by higher levels of the protocol stack (for example, the Transmission Control Protocol (TCP) layer) when higher layer acknowledgements are dropped or delayed. Still further, as to upstream traffic, the bi-directional policer can enforce traffic flow limits imposed by the network administrator protecting other shared resources in the infrastructure. For example, if the central controller 42 and an access point are connected over a Wide Area Network (WAN), traffic on the WAN uplink to the central controller 42 can be controlled (possibly to the client/flow level) so that advertised performance for all other users and services can be met.

Figure 4:
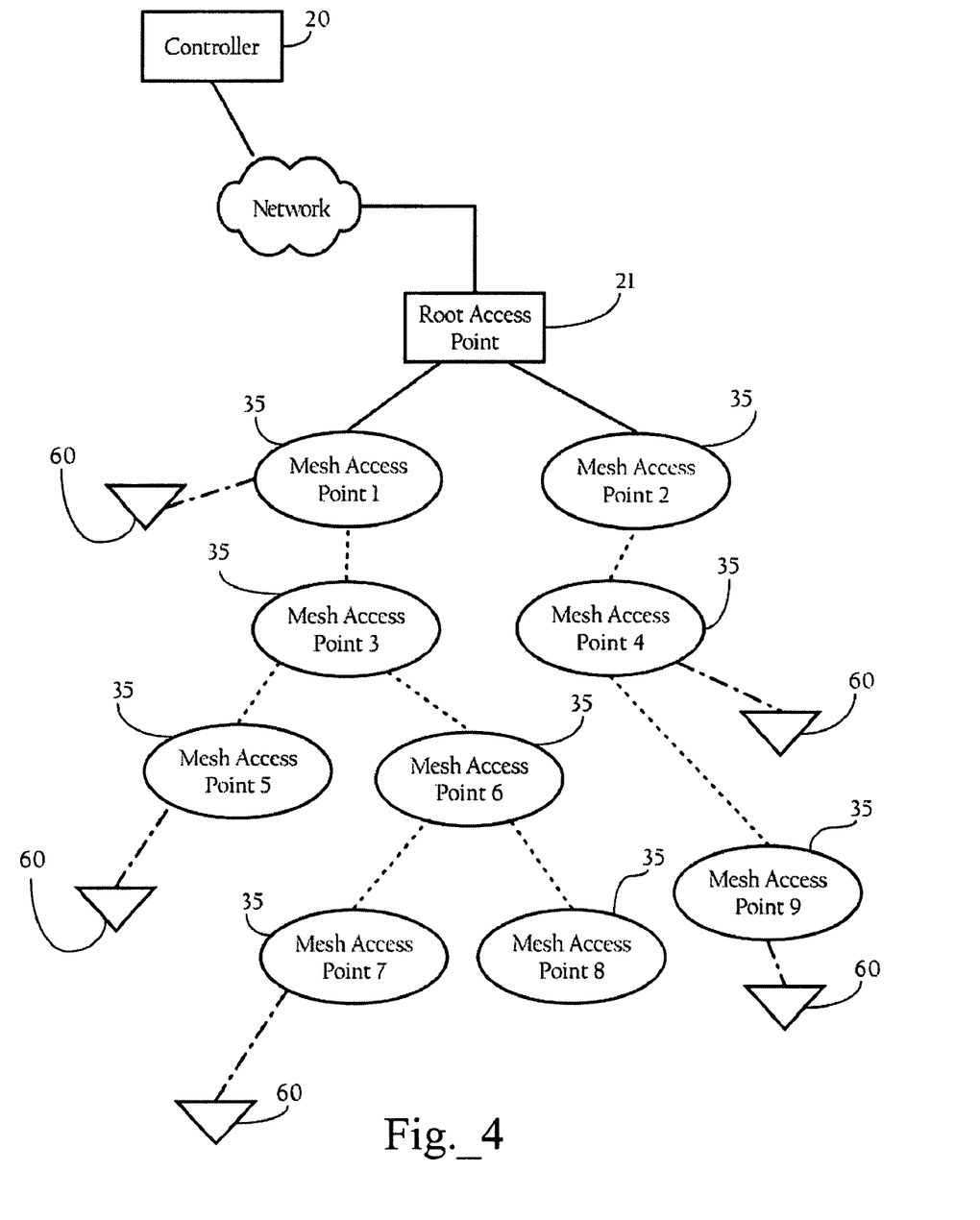
FIG. 4 illustrates an example hierarchical wireless mesh network in which bi-directional policers may be deployed.

Bi-directional policers can also be deployed in a wireless mesh network. In a hierarchical mesh network, for example, the wireless uplink bandwidth and the packet/content processing capability of the root mesh and child nodes is finite and should be shared in a deterministic way to guarantee performance of the service. Bi-directional policers can be applied at each ingress point to the mesh network. At each ingress point, a bi-directional policer may keep track of the bandwidth being used in either the upstream or downstream direction and may consequently limit the traffic flowing into the mesh network—thereby limiting congestion. Advantageously, the network administrator does not need to know ahead of time nor predict the upstream to downstream usage ratio. FIG. 4 illustrates a hierarchical mesh network including a controller 20, a root mesh access point 21 and a plurality of child access points 35. In a particular implementation, a bi-directional policer may be implemented at each ingress point to the mesh network including all child access points 35 that allow wireless clients to transmit data, and the root access point 21 or the controller 20. In such an implementation, the bi-directional policers implemented at the root access point 21 or controller 20 can be configured to apply remedial actions to downstream flows or aggregate flows, while the bi-directional policers of the child access points 35 could be configured to apply remedial actions to upstream flows or aggregate flows. In both instances, the bi-directional policers would measure traffic in the upstream and downstream traffic for the same flows, but apply remedial action in one direction, as discussed above. Similarly, in the controller-access point deployment illustrated in FIG. 1A, bi-directional policers, operating on the same flows, can be implemented at the controller 42 and the access points 50. In a particular implementation, the bi-directional policer(s) of the access points 50 can execute remedial action on upstream traffic to the controller 42, while the bi-directional policer(s) of the controller can apply remedial action to downstream traffic to the access points 50.

The present invention has been explained with reference to specific embodiments. For example, while embodiments of the present invention have been described as operating in connection with IEEE 802.11 networks, the present invention can be used in connection with any suitable wireless network environment. In addition, while the bi-directional policers discussed above are implemented in hardware, they may also be implemented in software. Other embodiments will be evident to those of ordinary skill in the art. It is therefore not intended that the present invention be limited, except as indicated by the appended claims.

What is claimed is:

1. An apparatus comprising:
   one or more network interfaces operative to receive and transmit frames over a communications medium;
   a classifier module operative to match received frames, transmitted in upstream and downstream directions, to a corresponding traffic classification of a plurality of traffic classifications and invoke a bi-directional policer associated with the corresponding traffic classification; and
   a plurality of bi-directional policers each associated with a particular traffic classification corresponding to upstream and downstream traffic, each of the plurality of bi-directional policers operative to measure utilization of the communications medium responsive to the received frames transmitted in the upstream and downstream directions when invoked by the classifier module, and conditionally apply a remedial action to the received frames, when the utilization of the communications medium exceeds a threshold;
   wherein conditionally applying the remedial action to the received frames comprises applying a first remedial action to upstream frames and applying a second remedial action to downstream frames, the first remedial action being different from the second remedial action.

2. The apparatus of claim 1 wherein the remedial action is exclusively applied to downstream frames.

3. The apparatus of claim 1 wherein one or more of the plurality of traffic classifications is based on a bi-directional flow of data between a first host and a second host.

4. The apparatus of claim 3 wherein the bi-directional flow is defined by tuple of attributes comprising a first host address, a second host address, a first port, a second port and a protocol identifier.

5. The apparatus of claim 1 wherein one or more of the plurality of traffic classifications is based on data flows associated with a first host.

6. The apparatus of claim 1 wherein one or more of the plurality of traffic classifications is based on data flows associated with a first access category.

7. The apparatus of claim 1 wherein one or more of the plurality of traffic classifications is based on data flows associated with a first wireless network.

8. The apparatus of claim 1 wherein one or more of the plurality of traffic classifications is based on data flows associated with a first host and a first access category.

9. The apparatus of claim 1 wherein the remedial action comprises discarding one or more of the received frames.

10. The apparatus of claim 1 wherein the remedial action comprises modifying tags associated with the received frames.

11. The apparatus of claim 1 wherein the remedial action comprises marking one or more of the received frames that can be optionally discarded.

12. The apparatus of claim 1 wherein the remedial action comprises marking one or more of the received frames for discard.

13. The apparatus of claim 1 wherein the remedial action comprises marking one or more of the received frames with a color indicative of a violation.

14. The apparatus of claim 1 wherein measured utilization of the communications medium is based on a time used to transmit or receive the frames.

15. An apparatus comprising:
one or more network interfaces operative to receive and transmit frames over a communications medium;
a bi-directional policer operative to measure utilization of the communications medium responsive to frames transmitted in upstream and downstream directions and identified by a plurality of classifiers, and conditionally apply a remedial action to the identified frames, when the utilization of the communications medium exceeds a threshold;
a first classifier operative to inspect frames transmitted in the downstream direction against one or more first matching attributes, and conditionally identify, to the bi-directional policer, frames that satisfy the one or more first matching attributes; and
a second classifier operative to inspect frames transmitted in the upstream direction against one or more second matching attributes, and conditionally identify, to the bi-directional policer, frames that satisfy the one or more second matching attributes;
wherein conditionally applying the remedial action to the identified frames comprises applying a first remedial action to upstream frames and applying a second remedial action to downstream frames, the first remedial action being different from the second remedial action.

16. The apparatus of claim 15 further comprising a decisional logic module operative to enforce the remedial action applied by the bi-directional policer.

17. The apparatus of claim 15 wherein the bi-directional policer implements a token bucket algorithm, wherein the utilization threshold is exceeded when a number of tokens is insufficient for a given frame.

18. A method comprising:
monitoring, at a first control point, utilization, by a given classification of network traffic, of a network transmission medium in both an upstream and downstream direction; and
applying, at the first control point, a remedial action to frames, matching the given classification of network traffic, when the monitored utilization in the upstream and downstream directions exceeds a threshold level;
wherein applying the remedial action to the frames comprises applying a first remedial action to one or more upstream frames and applying a second remedial action to one or more downstream frames the first remedial action being different from the second remedial action.

19. The method of claim 18 further comprising
monitoring, at a second control point, the utilization, by the given classification of network traffic, of the network transmission medium in both the upstream and downstream directions;
applying, at the second control point, a third remedial action to frames, in the upstream direction, matching the given classification of network traffic, when the monitored utilization exceeds the threshold level.

20. The method of claim 19 wherein the first control point is a root access point in a hierarchical wireless mesh network, and wherein the second control point is a child access point in the hierarchical wireless mesh network.

\* \* \* \* \*